O. T. WAITE.
GRASS TWINE MACHINE.
APPLICATION FILED OCT. 18, 1912.

1,110,842.

Patented Sept. 15, 1914.
2 SHEETS—SHEET 2.

Witnesses:
Harry S. Gaither
Wm. T. Bond

Inventor:
Ossian T. Waite.
by Banning & Banning
Atty's

UNITED STATES PATENT OFFICE.

OSSIAN T. WAITE, OF OSHKOSH, WISCONSIN, ASSIGNOR TO WAITE GRASS CARPET COMPANY, OF OSHKOSH, WISCONSIN, A CORPORATION OF WISCONSIN.

GRASS-TWINE MACHINE.

1,110,842.   Specification of Letters Patent.   Patented Sept. 15, 1914.

Application filed October 18, 1912.  Serial No. 726,513.

*To all whom it may concern:*

Be it known that I, OSSIAN T. WAITE, a citizen of the United States, residing at Oshkosh, in the county of Winnebago and State of Wisconsin, have invented certain new and useful Improvements in Grass-Twine Machines, of which the following is a specification.

The present invention relates to a machine for arranging and forming grasses into twine or similar material, and deals more particularly with the means for feeding and advancing the grasses to the twine forming mechanism.

The objects of the present invention are to provide a plurality of holders for the grasses and to arrange said holders about a common receptacle or conduit leading to the twine forming mechanism; to provide a set of feed rollers for each receptacle; to provide a selector for each holder operating in a substantially horizontal plane for selecting and delivering wisps of grass from said holders to said feed rolls; to arrange the feed rolls in a plane whereby the grasses, when discharged from said rolls, will be projected in a direct line toward the discharging or delivery end of the receptacle or conduit; to provide means for leveling the ends of the grasses contained in the holder; and to provide means for forcing said grasses toward the forward or discharge end of the holder.

The invention further consists in the features of construction and the combination of parts hereinafter described and claimed.

Figure 1:
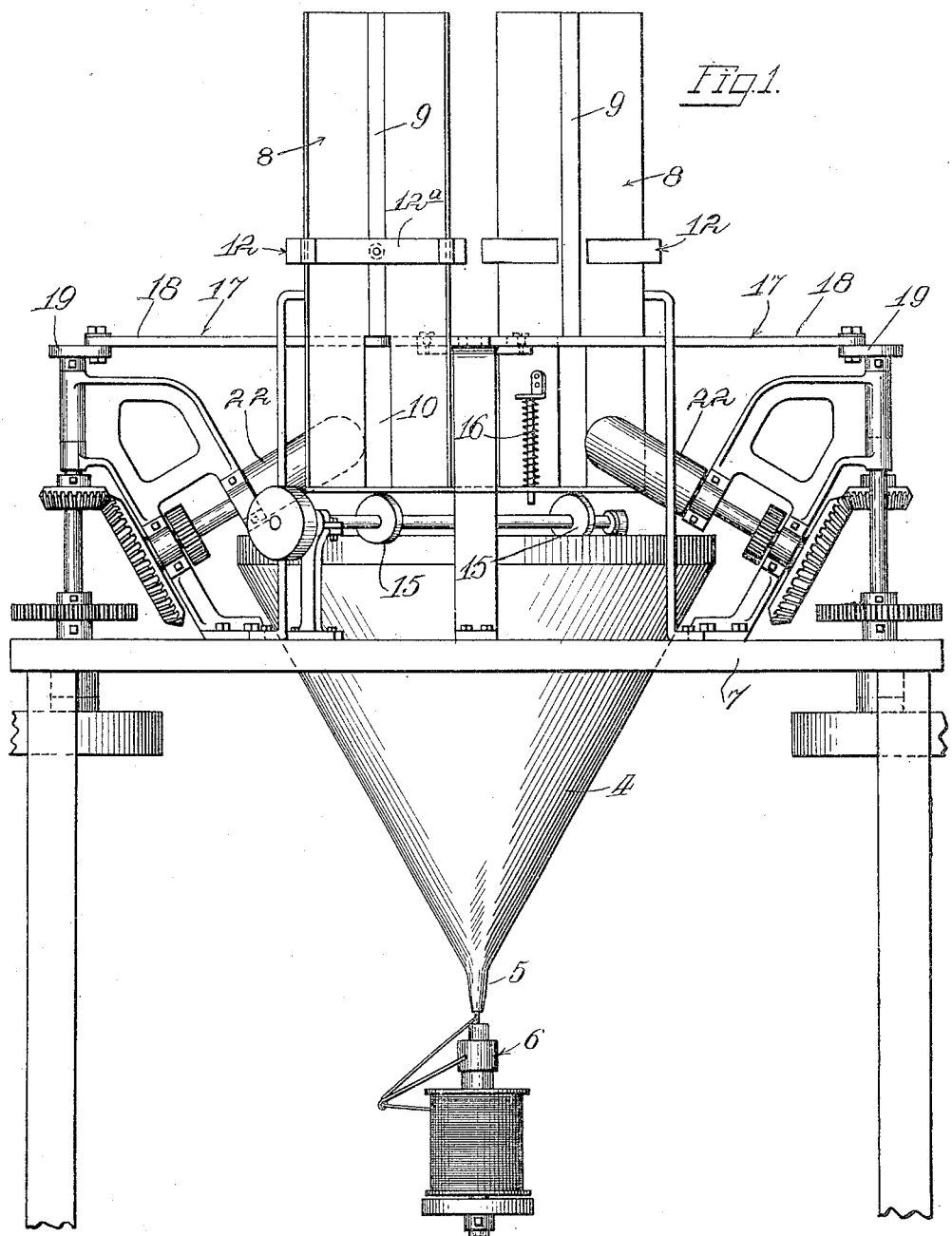
Figure 2:
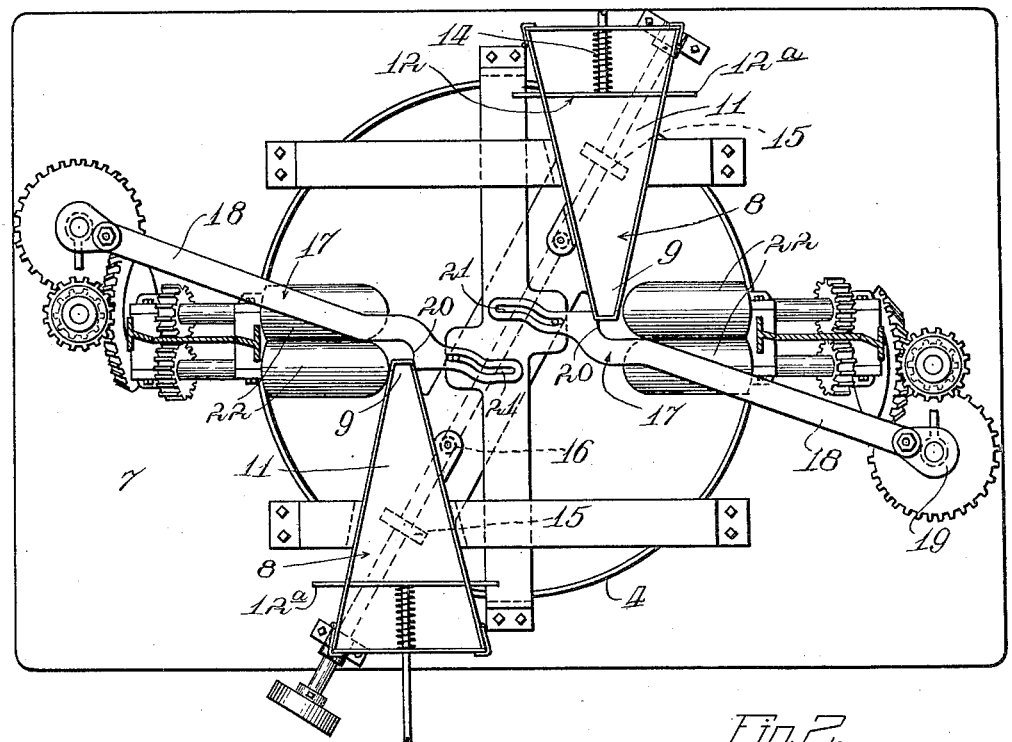
Figure 3:
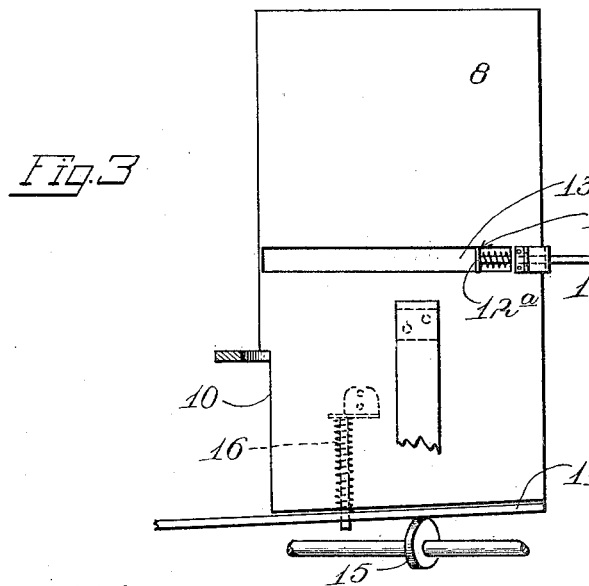

In the drawings, Figure 1 is a front elevation of the device of the present invention; Fig. 2 a plan view; and Fig. 3 a side elevation of one of the holders.

In the art to which the present invention relates difficulty has been experienced in producing a twine which will be of a smooth nature and of a uniform shade of color. This is owing to the fact that the grasses from which the twine is made are of different lengths and of different shades, and frequently in forming twine bunches of grass of a certain shade will be fed to the forming mechanism and immediately followed by a bunch of grass of a different shade. Thus, when the twine is completed, it will be streaked, and when woven into a mat or similar article will give an undesirable appearance to the same, and further a mass of grass of a relatively long length will be ofttimes followed by a mass of short length grasses, and when these various sized grasses are formed into twine they will not lie smooth and even, and will produce an undesirable lumpy and scraggly effect when the twine is woven into the form of a mat or rug.

In the present invention, a plurality of holders are employed, each of which holders, it is intended, will contain a grass of a certain quality; that is, in one holder will be placed all the dark grasses; in another all light grasses; in the third all short grasses; and in the fourth all long grasses, although the number of the holders is optional with the builder. Then by providing means for feeding a portion of grass from each of said holders, the grass entering the forming mechanism will be a mixture of all of said classes of grass, thereby producing a twine of substantially uniform color and of substantially uniform dimensions.

Referring to the drawings, the means which I have employed as illustrating one method of carrying out this invention comprises a funnel-shaped receptacle or conduit 4, which has its discharge ends 5 terminating adjacent to a twine forming mechanism 6 of any suitable size and style. The conduit or receptacle is supported by any suitable means upon a table 7, and arranged above said conduit and around the same are a plurality of grass holders 8. In the device illustrated I have shown only two of said holders, but it is understood that the number of said holders may be any number greater than two desired. It is the intention that each of these holders shall contain a certain class or grade of grass, as, for instance, one of them may contain the lighter grasses; the second the dark grasses, etc.

The holders are arranged so that the grasses contained therein extend in a vertical or substantially vertical plane and each of the holders, as shown, is of triangular formation in cross sections with its apex or contracted end 9 constituted and arranged to provide the forward or discharge end of said holder, and from this point the ends of the grasses are deflected therefrom and into the bite of the feed rolls. The lower forward end of each holder is cut away, as indicated at 10 in Figs. 1 and 3. This is to enable the selector mechanism to enter into the mass of grasses contained in the holder.

The floor 11 of each holder preferably slopes downward toward the forward end thereof, so that the tendency of the mass of grasses within the holder is to advance toward the forward or discharge end thereof. In order, however, to more effectively accomplish the feed of the grasses toward the forward end of the holder, a pressing or crowding member 12 may be employed in the form shown. This member consists of a bar 12ª traveling in slots 13 in the slides of said holder, and said bar is constantly advanced and pressed, in the form shown, toward the forward end of the holder by tension mechanism 14.

It is desirable in a device of this kind to level an end of the grasses prior to their being fed forward to the forming mechanism, and in the present instance the means which I have illustrated to effect the leveling operation comprises a cam or similar member 15 which operates against the floor 11 of the holders. This floor is movable with respect to the body of the holder, whereby said cam in rotating will vibrate or joggle the floor of the holder, and thus level the lower ends of the grasses contained therein. Thus, the grasses, when fed out of the holders, will have their lower ends substantially aligned, so that they enter the feed mechanism in substantially uniform order, a tension member 16 being provided for maintaining the floor in constant engagement with the cam.

The selector mechanism 17 which I have illustrated as one form of mechanism for carrying out this portion of the operation of a machine consists of a plate or bar 18, which is reciprocated by means of a crank arm 19 driven by any suitable means from a suitable source of power, and the bar 18 is provided with a hook or similar device 20 which engages the ends of a bunch or wisp of grass lying within the holder and flexes and delivers them into the bite of the feed rolls. The selector illustrated is provided with a cam slot 21 which causes it to travel with a four way motion. The particular form of selector illustrated is not claimed as a part of the present invention, but is merely used to illustrate a form of selector which is capable of operating in a horizontal plane, as a type or form of selector so operating is deemed to be extremely desirable with a device of the nature of the present invention.

For each of the holders 8 I provide a set of feed rolls 22 which may be of any suitable form and size, and these rolls, as best illustrated in Fig. 1, are lying in a plane which is substantially at right angles to a line radially extending from the discharge opening of the conduit or receptacle 4. By this arrangement the grasses, when discharged from said feed rolls, will be passed into the receptacle in a line which extends approximately direct from said rolls to the discharge end of the conduit. It has been found that, by running the rolls at a relatively high rate of speed, the grasses will be fanned or spread out prior to their being discharged into the conduit, and will thus pass into the forming mechanism in a somewhat staggered arrangement, which is a very desirable feature in devices similar to the one of the present invention.

By the arrangement above described, of the devices of the present invention, it will be noted that the grasses will depart very slightly from the position they assume in the holder from the time they leave the holder until they are discharged into the forming mechanism; that is, they will remain at all times in a substantially vertical position. This eliminates any undesirable flexing or bending of the grasses during their transmission which would tend to disarrange the same, and provides for a speedy and simple method of delivering the grasses from the holders to the forming mechanism.

The operation of the device is briefly as follows: The holders are first filled with grasses which will be placed therein in a substantially vertical position. The selectors will actuate to extract wisps of grass from each holder and deliver them into the bite of the feed rolls associated therewith, and the feed rolls in turn will project or discharge them into the receptacle or conduit from which they will pass into the forming mechanism. As previously explained, the holders will contain different grades and character of grasses, whereby the assortment of grasses fed to the receptacle or conduit will be of a mixed nature and produce a twine of substantially uniform color and size. During the operation the presser member 12 will serve to keep the grasses crowded toward the front or discharge end of the receptacle, and the action of the cams 15 will jostle or agitate the floor 11 of the holders, whereby the butt ends of the grasses will be leveled and will be delivered to the feed rolls in even condition.

I claim:

1. In a device of the class described, the combination with a twine forming mechanism, of a funnel-shaped conduit leading thereto, a series of holders arranged about said conduit and having their inner ends overlying said conduit, a set of feed rolls for each holder arranged at approximately right angles to a radial line extending from the discharge end of said conduit, horizontally disposed means for selecting and delivering wisps of grass from said holder to said feed rolls, and means operatively connected for reciprocating said selecting means, substantially as described.

2. In a device of the class described, the combination with a twine forming mechanism, of a funnel-shaped conduit leading thereto, a series of holders arranged about said conduit and having their inner ends overlying said conduit, a set of feed rolls for each holder arranged at approximately right angles to a radial line extending from the discharge end of said conduit, horizontally disposed means for selecting and delivering wisps of grass from the holders to said feed rolls, means operatively connected for reciprocating said selecting means, and means for leveling the ends of the grasses contained within the holder, substantially as described.

3. In a device of the class described, the combination of a series of holders arranged to support grasses in a vertical position therein, means for leveling the lower ends of said grasses, a set of feed rolls for each holder, a single funnel-shaped receptacle into which said feed rolls discharge said rolls having their axial centers arranged at approximately right angles to a radial line extending from the discharge end of said receptacle, and means for delivering wisps of grasses from said holders to said feed rolls, substantially as described.

4. In a device of the class described, the combination with a twine forming mechanism, of a funnel-shaped conduit leading thereto, a series of holders arranged about said conduit and having their inner ends overlying the same, said holders being adapted to support grasses vertically therein, means for leveling the lower ends of the grasses contained within the holder, a set of feed rolls for each holder, said rolls being disposed at approximately right angles to a radial line extending from the discharge end of said holder, and means for selecting and delivering wisps of grass from said holder to said feed rolls, substantially as described.

5. In a device of the class described, the combination of a series of holders adapted to support grasses vertically therein, the floor of each of said holders sloping in a downward direction toward the forward end thereof, means for forcing the grasses toward the forward ends of said holders, a set of feed rolls for each holder, a common receptacle into which said feed rolls discharge, and means for selecting and delivering wisps of grass from said holders to said feed rolls, substantially as described.

6. In a device of the class described, the combination of a series of holders arranged to support grasses vertically therein, a floor for each of said holders movable with respect to the body of said holders, means for vibrating said floors to level the ends of the grasses contained within the holders, a set of feed rolls for each holder, a common receptacle into which said feed rolls discharge, and means for selecting and delivering wisps of grass from said holder to said feed rolls, substantially as described.

7. In a device of the class described, the combination of a series of holders arranged to support grasses vertically therein, a floor for each holder movable with respect to the body of the holder, means for vibrating said floors to level the ends of the grasses contained within the holders, said floors sloping downwardly toward the forward ends of said holders, a set of feed rolls for each holder, a common receptacle into which all of said feed rolls discharge, and means for selecting and delivering wisps of grass from said holders to said feed rolls, substantially as described.

OSSIAN T. WAITE.

Witnesses:
D. L. RODERICK,
GEO. J. MEY.

Copies of this patent may be obtained for five cents each, by addressing the "Commissioner of Patents, Washington, D. C."